United States Patent
Verma et al.

(10) Patent No.: US 7,065,358 B2
(45) Date of Patent: Jun. 20, 2006

(54) IDENTITY PROTECTION IN A LAN-UNIVERSAL RADIOTELEPHONE SYSTEM

(75) Inventors: Shaily Verma, Powai (IN); Charles Chuanming Wang, Jamison, PA (US); Junbiao Zhang, Bridgewater, NJ (US); Guillaume Bichot, La Chapelle Chaussée (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/524,183

(22) PCT Filed: Aug. 11, 2003

(86) PCT No.: PCT/US03/25129

§ 371 (c)(1),
(2), (4) Date: Feb. 10, 2005

(87) PCT Pub. No.: WO2004/016010

PCT Pub. Date: Feb. 19, 2004

(65) Prior Publication Data

US 2005/0202815 A1    Sep. 15, 2005

Related U.S. Application Data

(60) Provisional application No. 60/403,159, filed on Aug. 13, 2002.

(51) Int. Cl.
*H04Q 7/20* (2006.01)
(52) U.S. Cl. .............................. 455/435.1; 455/432.1; 455/433; 455/434; 455/456.1
(58) Field of Classification Search ............ 455/422.1, 455/410, 411, 432.1, 432.3, 433, 435.2, 456.1
See application file for complete search history.

(56) References Cited

U.S. PATENT DOCUMENTS

| 6,104,929 | A | 8/2000 | Josse et al. | |
|---|---|---|---|---|
| 6,275,706 | B1 | 8/2001 | Rune | |
| 6,308,267 | B1 | 10/2001 | Gremmelmaier | |
| 6,463,055 | B1 * | 10/2002 | Lupien et al. | 370/353 |
| 2003/0219024 | A1 * | 11/2003 | Purnadi et al. | 370/401 |
| 2004/0017798 | A1 * | 1/2004 | Hurtta et al. | 370/352 |
| 2005/0157673 | A1 * | 7/2005 | Verma et al. | 370/328 |
| 2005/0254469 | A1 * | 11/2005 | Verma et al. | 370/338 |

OTHER PUBLICATIONS

Copy of Search Report dated Nov. 16, 2003.

* cited by examiner

*Primary Examiner*—Temica Beamer
(74) *Attorney, Agent, or Firm*—Joseph J. Laks; Robert B. Levy

(57) ABSTRACT

A mobile wireless terminal, upon transitioning from a wireless telephony network to a wireless Local Area Network (LAN), seeks identification by sending the same identity information used for identification in the wireless telephony network. Upon receipt of the identity information, a wireless LAN Access Server in the wireless telephony network identifies a Serving General Packet Radio Service Serving Node (SGSN) that had last served the wireless terminal in the wireless telephony network prior to transition. The wireless LAN Access Server forwards the identity information to the SGSN, which, in turn, provides an identification response for validating the terminal.

6 Claims, 1 Drawing Sheet

IDENTITY PROTECTION IN A LAN-UNIVERSAL RADIOTELEPHONE SYSTEM

CROSS REFERENCE TO RELATED APPLICATION

This application claims the benefit, under 35 U.S.C. § 365 of International Application PCT/EP02/25129, filed Aug. 11, 2003, which was published in accordance with PCT Article 21(2) on Feb. 19, 2004 in English and which claims the benefit of U.S. provisional patent application No. 60/403,159, filed Aug. 13, 2002.

TECHNICAL FIELD

This invention relates to a technique for protecting the identity of the user of a mobile wireless terminal upon a transition from one wireless network to another.

BACKGROUND ART

Advances in the field of wireless LAN technology has led to the availability of relatively inexpensive wireless LAN equipment, which, in turn, has resulted in the emergence of publicly accessible wireless LANs (e.g., "hot spots") at rest stops, cafes, libraries and similar public facilities. Presently, wireless LANs offer users access to a private data network, such as a Corporate Intranet, or a public data network such as the Internet. Few if any publicly accessible wireless LAN's offer any type of telephone service, let alone, wireless telephony service.

Presently, users seeking wireless telephony service typically subscribe to one of many providers of such service. Today's wireless telephony service providers not only offer voice calling but also offer General Packet Radio Service (GPRS) to enable the exchange data packets via a mobile wireless terminal. While GPRS exists in many areas, data transmission rates typically do not exceed 56 Kbps and the costs to wireless network service providers to support this service remain high, making GPRS expensive.

To provide enhanced data communications, efforts are underway to establish new standards for wireless telephony. One such effort is the proposed "Universal Mobile Telecommunications System (UMTS)" standard specified by the 3rd Generation Partnership Project (3GPP) for advanced packet radio service in wireless telephony networks. The UMTS standard proposes transmission rates as high as 2 Mbps. However, the relatively low cost to implement and operate a wireless LAN, as well as the available high bandwidth (usually in excess of 10 Megabits/second) makes the wireless LAN a preferred access mechanism, even as compared to a UMTS network. Given the advantage of lower cost and higher bandwidth, mobile wireless terminal users will often seek to transition to a wireless LAN when such service is available. When wireless LAN service becomes no longer available, the user will transition back to the wireless telephony network.

Access to the wireless telephony network and the wireless LAN both require user identification and verification. From the perspective of the network operator, revenue generation depends on reliable user identification and verification. Absent correct user identification and validation, the network operator will likely be unable to bill for such services. From the user's perspective, identification and verification should occur in a manner that safeguards against identity fraud. Thus, user identification should not occur in a manner that would allow others to make improper use of such information.

Presently, a user seeking access to a wireless telephony network receives a temporary identity, known as a Packet Temporary Mobile Subscriber Identity (P-TMSI). Typically, a Visited Location Register (VLR) attached to Serving GPRS Support Node (SGSN) in the wireless telephony network maintains a copy of the user's P-TMSI. The SGSN maps the P-TMSI to a permanent identity, known as the International Mobile Subscriber Identity (IMSI). To avoid compromising the user's identity, the wireless telephony network will assign the user a different P-TMSI if a long interval has elapsed since a previous identification.

Current wireless LANs lack secure user identification and verification mechanisms. A potential security risk currently exists for users seeking to transition to a wireless LAN from a wireless telephony network.

Thus, there is a need for a technique for protecting the identity of a user when transitioning from one wireless network to another.

BRIEF SUMMARY OF THE INVENTION

Briefly, in accordance with a preferred embodiment of the present principles, there is provided a method for identifying the user of a mobile wireless terminal upon transitioning from a first wireless network to a second wireless network. The method commences upon receipt in the second network of a request for identification from the user upon a transition to that network. The identification request includes a temporary identifier previously supplied by the mobile wireless terminal to identify itself in the first wireless network. From the identification request, an identification is made of a node in the first network last accessed by the mobile wireless terminal. Upon identifying the last-accessed node, the identification request received in the second network is forwarded to the last-accessed node in the first network, which in turn, verifies the user's permanent identity from the temporary identifier. Such verification information is then returned to the second network, which in response, grants access to the user upon successful user verification. By sending a temporary identity to identify itself in the second network, the user avoids the need to send its permanent identity during the network transition, which could be intercepted resulting in a breach of security.

DETAILED DESCRIPTION

Figure 1:
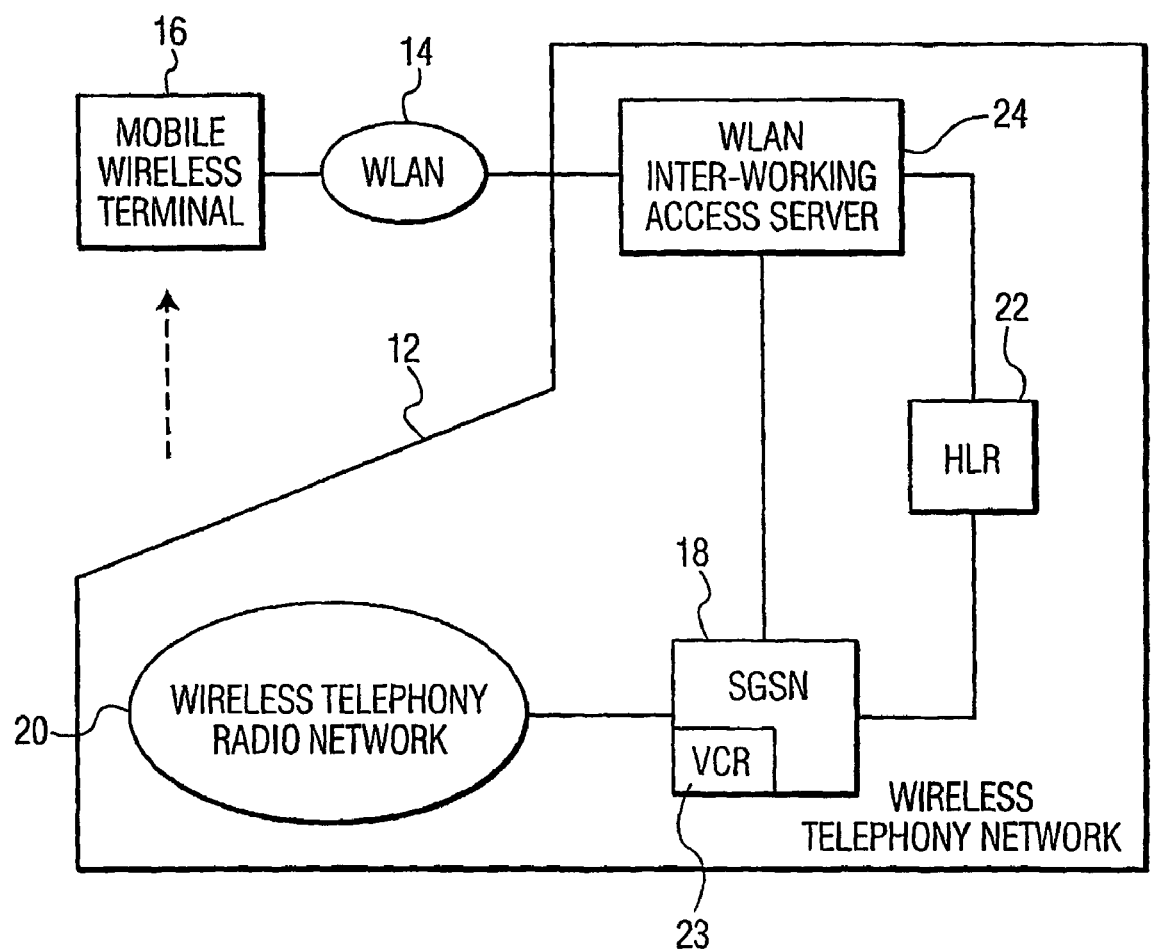
FIG. 1 illustrates a block schematic diagram of a wireless telephony network interworked with a wireless LAN for providing communication service to a mobile wireless terminal.

FIG. 1 depicts an illustrative embodiment of a wireless telephony network 12 interworked with a wireless Local Area Network (LAN) 14 to provide communications service to a mobile wireless terminal 16 in accordance with the present principles. In practice, the mobile wireless terminal 16 will attach itself to the wireless telephony network 12 to obtain voice and/or data services. However, for higher speed, lower cost data access, the user of mobile wireless terminal 16 often will transition from the wireless telephony network 12 to the wireless LAN 14 upon entering the coverage area of the later. A reverse transition occurs when the user leaves the wireless LAN for the wireless telephony network.

In the illustrated embodiment, the wireless telephony network 12 has the architecture proposed in the "Universal Mobile Telecommunications System (UMTS)" standard for advanced packet radio service. Accordingly, the wireless telephony network 12 includes at least one Serving GPRS Support Node (SGSN) 18 for authenticating the mobile wireless terminal 16. The SGSN 18 also serves to process packet data for exchange with the mobile wireless terminal 16 while the terminal communicates with the wireless telephony network 12 through a wireless telephony radio network 20. Although FIG. 1 depicts one wireless telephony radio network 20, the wireless telephony network 12 could include multiple radio networks, each managed by a separate SGSN. A Home Location Register (HLR) 22 in the wireless telephony network 12 stores records of current wireless telephony service subscribers and contains packet domain subscription information as well as location information of which SGSN 18 serves a particular mobile wireless should the wireless telephony network contains more than one SGSN.

The wireless telephony network 12 also includes a wireless LAN (WLAN) interworking access server 24 for managing the interface between the wireless LAN 14 and the wireless telephony network. The WLAN interworking access server 24 performs a function similar to the SGSN 18. Thus, the WLAN interworking server 24 authenticates the mobile wireless terminal. It may or may not process the packet data depending on whether the data connection needs to go through the wireless telephony network or not. In accordance with the present principles, the WLAN interworking access server 24 cooperates with the SGSN 18 to perform secure identification of the mobile wireless terminal 16 upon a transition from the wireless telephony network 12 to the wireless LAN 14 using the P-TMSI provided by the wireless mobile terminal. As described in greater detail below, such identification provides security by obviating the need for the mobile wireless terminal 16 to send a permanent identity.

Upon the very first direct access of the wireless telephony network 12, the mobile wireless terminal 16 will receive a temporary identity, usually referred to as a Packet Temporary Mobile Subscriber Identity (P-TMSI) as part of the registration process. Upon each subsequent direct access of the wireless telephony network 12, the terminal will deliver its P-TMSI to the corresponding SGSN 18 through the wireless radio network 20. Using its Visited Location Register (VLR) 23, the SGSN 18 maps the P-TMSI to the user's permanent identity, referred to as an International Mobile Subscriber Identity (IMSI) to verify the user of the terminal.

When accessing the wireless telephony network 12, the mobile wireless terminal 16 uses its temporary identity (P-TMSI) such that its real identity need not cross the radio interface after initial registration. In the case of a handoff from one SGSN to another, the new SGSN receives the P-TMSI from the mobile wireless terminal 16. If the new SGSN does not currently serve the mobile wireless terminal user 16, the new SGSN will query the "old" SGSN. By doing so, the new SGSN will retrieve the address of the "old" SGSN that had previously served the mobile wireless terminal 16 and had last mapped the temporary identity of the terminal to its permanent identity. The new SGSN will request that the old SGSN send back the IMSI associated with the temporary address (P-TMSI) previously supplied by the mobile wireless terminal 16.

Heretofore, there did not exist a secure access arrangement that allowed the mobile wireless terminal 16 to transition from the wireless telephony network 12 to the wireless LAN 14 while maintaining the terminal's identity secure from possible interception. Typically, the user of the mobile wireless terminal 16, upon transitioning to the wireless LAN 14, needed to send its permanent identity (i.e., its IMSI) to the wireless LAN 14, thus compromising its identity.

In accordance with the present principles, there is provided a technique for protecting the IMSI of the mobile wireless terminal 16 upon transitioning from one wireless network (the wireless telephony network 12) to the wireless LAN 14. To protect the identity of the user, the technique of the present principles makes use of the user identity information (i.e., the P-TMSI) maintained by the last-attached SGSN (e.g., SGSN 18 of FIG. 1) to verify the user's permanent identity in the wireless LAN 14. Such user identification and verification occurs as follows:

1. Upon transitioning to the wireless LAN 14, the mobile wireless terminal 16 sends the same identity information it previously sent to the wireless telephony network 12. Such identity information includes the old (i.e., previously sent) P-TMSI, P-TMSI signature and Routing Area Identifier (RAI). As described, the P-TMSI constitutes a temporary user identification. The P-TMSI signature provides verification of the P-TMSI, whereas the RAI distinguishes each SGSN 18 accessible to the mobile wireless terminal 16. Each SGSN 18, as well as the WLAN interworking access server 24, has its own unique RAI. Heretofore, the RAI only identified SGSNs in the wireless telephony network 12. In accordance with an aspect of the present principles, the WLAN interworking access server 24 has its own RAI, so the server appears simply as another SGSN. In this way, the WLAN interworking access server 24 can query an old SGSN with a P-TMSI received from the mobile wireless terminal 16 for the purpose of obtaining the IMSI of the terminal.

2. Upon receipt of the identity information (i.e., the P-TMSI, P-TMSI signature, and RA), the wireless LAN 14 forwards such information to the WLAN interworking access server 24 in the wireless telephony network 12. From such identity information, the WLAN interworking access server 24 first determines the identity of the old SGSN 18 previously accessed by the mobile wireless terminal 16 immediately prior to transitioning to the wireless LAN 14. Typically, the WLAN interworking access server 24 identifies the old SGSN by finding its address through an association with the old Routing Area in the RAI supplied by the mobile wireless terminal 16. Typically, the WLAN interworking access server 24 knows the address of each SGSN in the wireless telephony network 12 via the HLR 22. In the event that the WLAN interworking access server 24 does not know the address of the old SGSN 18, the server can acquires the address from a Domain Naming System (DNS) server (not shown) using a logical address provided by the mobile wireless terminal 16.

3. After identifying the old SGSN 18, the WLAN interworking access server 24 then sends the P-TMSI, P-TMSI signature and RAI to the old SGSN 18 to request the user's IMSI.

4. In response to the request from the WLAN interworking access server 24, the old SGSN 18 maps the P-TMSI to the IMSI. In this way, the old SGSN provides an identification response that includes both the IMSI and appropriate authentication vectors to identify the mobile wireless terminal 16. If unable to identify the mobile wireless terminal 16, the old SGSN 18 provides an appropriate error message.

5. After establishing the user's identity from the mapping performed by the old SGSN 18, the wireless LAN 14 will verify that the user of the mobile wireless terminal 16 constitutes a valid user and is entitled to use the Wireless LAN.

6. When a user moves away from the wireless LAN and transitions back to wireless telephony network, the WLAN interworking access server 24 serves as "old" SGSN. Upon request, it sends an identification response to a new SGSN in the wireless telephony network to which the user terminal is being attached.

The identification and verification technique of the present principles affords the advantage of providing secure user identification while minimizing repeated access of the HLR 20 by the WLAN interworking access server 24. Instead of broadcasting a permanent wireless LAN identifier easily intercepted by others, the identification technique of the present principles makes use of the secure identification process of the wireless telephony network 12. Thus, the identity of the user of the mobile wireless terminal 16 remains protected upon a transition from the wireless telephony network 12 to the wireless LAN 14.

The invention claimed is:

1. A method for identifying a mobile wireless terminal upon a transition of the terminal from a wireless telephony network to a wireless Local Area Network (LAN), comprising the steps of:
   receiving in the wireless LAN from the mobile wireless terminal identity information previously used by the mobile wireless terminal to access the wireless telephony network;
   identifying a serving node in the wireless telephony network that last served the mobile wireless terminal prior to transitioning to the wireless LAN in accordance with the identity information received from the mobile wireless terminal in the wireless LAN, the identity information identity information including a temporary mobile subscriber identity, a temporary, signature and a routing Identifier;
   forwarding the identity information of the mobile wireless terminal to the last-accessed serving node in the wireless telephony network for identification;
   receiving from the last-accessed serving node in the wireless telephony network an identification response indicating whether the mobile wireless terminal has been properly identified; and
   validating the mobile terminal in accordance with the identification response.

2. The method according to claim 1 wherein the step of identifying the serving node in the first wireless network further comprises the step of Identifying the serving node in accordance with the routing identifier received from the mobile wireless terminal.

3. The method according to claim 1 further comprises the steps of:
   receiving a logical address information from the mobile wireless terminal; and
   accessing a Domain Naming System (DNS) server to identify the serving node in accordance with the logical address.

4. The method according to claim 1 further comprising the step of providing an error message when the serving node cannot identify the mobile wireless terminal from the temporary identity information.

5. A wireless telephony network for identifying a mobile wireless terminal upon a transition of the terminal from the wireless telephony network to a wireless Local Area Network (LAN), comprising:
   a serving node for identifying the mobile wireless terminal upon access to the wireless telephony network; and
   an access server for receiving from the wireless LAN temporary identity information from the mobile wireless terminal previously used by the terminal to access the wireless telephony network and for identifying the serving node in the first wireless network that last served the mobile wireless terminal prior to transitioning to the second wireless network by forwarding the identity information of the mobile wireless terminal to the serving node for identification and from the identification response, the access server indicating whether the mobile wireless terminal has been properly identified and forwarding such response to the wireless LAN to validate the mobile wireless terminal by the WLAN, the temporary identity information including a a temporary mobile subscriber identity, a temporary signature, and a routing identifier.

6. The network according to claim 5 wherein the access server has its own routing identifier distinct from routing identifier assigned to the serving node.

* * * * *